James V. Johnston,
INVENTOR.

United States Patent Office 3,161,064
Patented Dec. 15, 1964

3,161,064
AIR BEARING DOUBLE INTEGRATING
ACCELEROMETER
James V. Johnston, 821 Giles Drive, Madison, Ala.
Filed June 11, 1962, Ser. No. 201,740
3 Claims. (Cl. 73—490)
(Granted under Title 35, U.S. Code (1952), sec. 266)

The invention described herein may be manufactured and used by or for the Government for governmental purposes without the payment of any royalty thereon.

This invention relates to an accelerometer and more particularly to an air-bearing double integrating accelerometer.

In the past accelerometers utilized movable mechanical members to generate an electrical or mechanical signal responsive to acceleration of the vehicle in which the accelerometer is mounted. Not only does my invention generate a signal indicative of the acceleration of the vehicle in which it is mounted but it also generates a signal which is directly proportional to the velocity the vehicle is traveling and the distance that the vehicle has traveled.

In order that the accelerometer detect the minutest amount of movement or acceleration, the sensing element is supported by a layer of air, therefore it is substantially frictionless. My accelerometer utilizes the force balance theory of detecting motion but does not incorporate any mechanical restraints with their inherent non-linearity.

In view of these facts, an object of this invention is to provide an accurate air-bearing double integrating accelerometer.

Another object of the invention is to provide a device that will generate a signal indicative of acceleration, velocity, and the distance traveled by the vehicle in which the device is mounted.

A further object of the invention is to provide an accelerometer that does not incorporate any mechanical restraints.

The foregoing and other objects of this invention will become more fully apparent from the following detailed description of the embodiment of the invention and from the accompanying drawings, in which.

Figure 1:
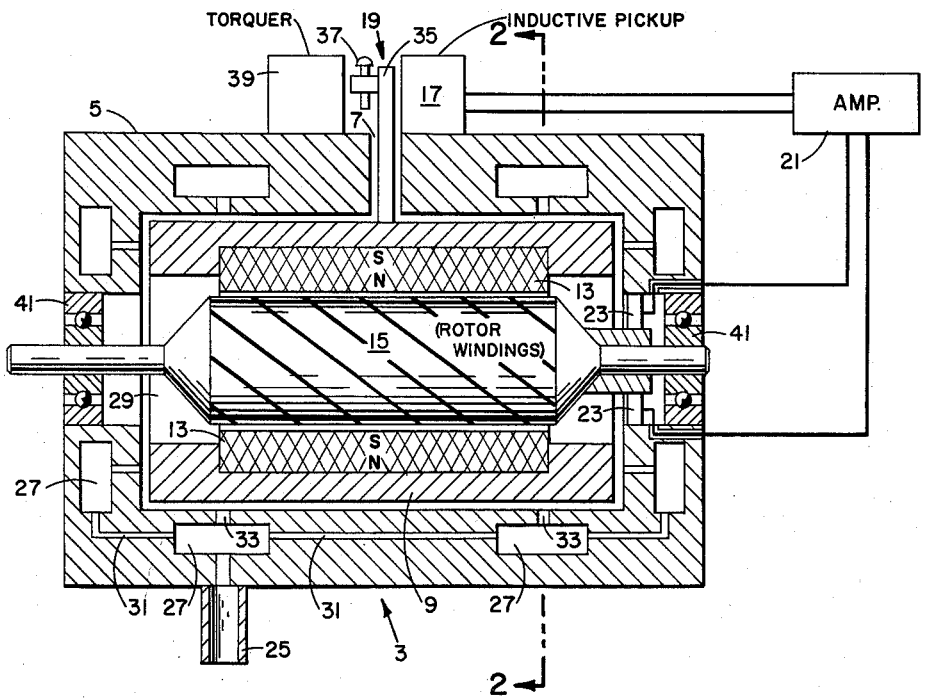
FIGURE 1 is a cross sectional view showing the construction of an accelerometer in accordance with the invention.
Figure 2:
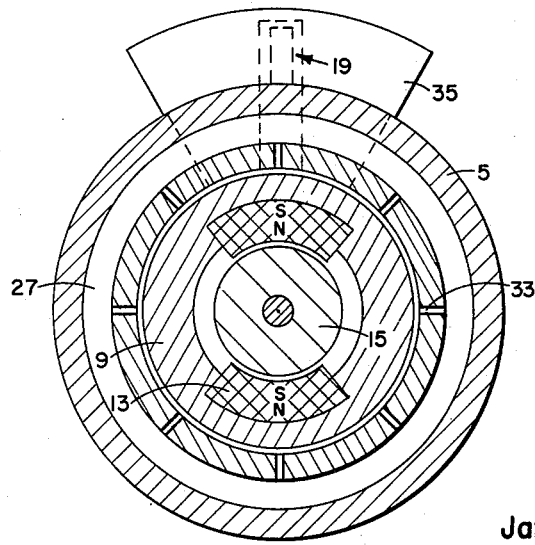
FIGURE 2 is a sectional view of the accelerometer taken along line 2—2 of FIGURE 1.

Referring now to the drawings wherein like reference characters designate like or corresponding parts throughout the two views, there is shown a preferred embodiment of the invention. The numeral 3 designates an air-bearing double integrating accelerometer comprising: a cylindrical housing 5 having a segmental aperture 7 therein normal to the longitudinal axis of the housing; a cylindrical air supported sensing element 9 disposed within the housing so as to allow the element to move responsive to acceleration; a plurality of permanent magnet stator poles 13 mounted on the inner surface of the cylindrical sensing element; a D.C. motor rotor 15 rotatably disposed within the sensing element and adjacent the stator poles; inductive pickup means 17 mounted on the outer periphery of the housing for generating an electrical signal responsive to the movement of an unbalanced mass 19 which is connected to the air supported sensing element; and an electrical circuit comprising an amplifier 21 and brushes 23 connected to the output of the pickup means for energizing the D.C. motor rotor in order to rotate the rotor at a rate which is proportional to the acceleration of the accelerometer.

The cylindrical housing has an air inlet 25 therein for coupling an external supply of air to a plurality of circular air chambers 27. In order to distribute the air uniformly throughout inner chamber 29 of the housing, the air chambers 27 are interconnected by means of passageways 31 and the air is fed through openings 33 to support cylindrical sensing element 9 on a layer of air.

For the purpose of displacing the air supported cylindrical sensing element responsive to acceleration, the unbalanced mass 19, which is composed of a copper lever arm 35 and an adjusting weight 37, is connected to the cylindrical sensing element through segmental aperture 7.

A conventional torquer 39 is mounted on the housing adjacent the unbalanced mass for aligning the unbalanced mass to a null position so that the accelerometer can be zeroed prior to movement. The torquer may be of any suitable known kind such as the type disclosed in Patent No. 2,926,530.

In order to measure the deviation of the copper lever arm from the null position, a conventional pickup, such as the magnetic pickup disclosed in Patent No. 2,926,530, is mounted on the housing adjacent the unbalanced mass. The magnitude of the output signal from pickup 17 is directly proportional to the deviation of the copper lever arm from the null position and the output signal has a polarity which is indicative of the direction in which the unbalanced mass is displaced.

The output signal from the pickup is amplified by amplifier 21 and fed to brushes 23 to energize the wound rotor. The rotor is a D.C. motor rotor and it is supported on bearings 41.

The operation of the device is as follows:

Compressed air is supplied to air inlet 25 and the air flows through air chambers 27 to the inner chamber of the housing to support the cylindrical sensing element. The air flows around the sensing element and out the inner chamber via segmental aperture 7. After the air supply is turned on, the torquer 39 is energized, by means not shown, and the torquer aligns the lever arm or unbalanced mass to the null position. Once the lever arm is in the null position the accelerometer is ready to start measuring the acceleration, velocity, and the distance traveled by the vehicle.

When the assembly is accelerated in a direction perpendicular to its rotational axis and perpendicular to the unbalanced mass, the unbalanced mass will cause a rotational torque to be applied to the air supported sensing element 9. This rotational torque causes a displacement of lever arm 35 and the displacement is sensed by the pickup means 17. The pickup transmits the displacement signal to amplifier 21 which in turn amplifies the signal and feeds it to the rotor of the motor via brushes 23. The polarity of this signal is such that it causes the rotor to turn in the same direction as the unbalanced mass. The motor will react in a manner similar to all electric motors, that is, when a voltage is applied to the brushes of an electric motor, the rotor will begin to turn by creating a flux field which opposes the stator flux field. In a normal electric motor the stator is restrained to the outside housing causing only the rotor to turn. However, in this application the stator is not restrained, hence it will attempt to rotate in the opposite direction from which the rotor turns. The reaction torque produced by the rotor opposes the torque produced by the acceleration. Therefore, the stronger the acceleration torque acting on the unbalanced mass the greater the voltage will be to drive the rotor and create counteracting torque to keep the pickup at null. The result of this counteracting torque is the rotation of the output shaft of the rotor; the acceleration of which is proportional to the acceleration applied to the unbalanced mass. Consequently, the speed or the revolutions per minute of the rotor shaft is proportional to the speed or velocity of the vehicle. Any well known device, such as a tachometer, may be mounted on the shaft of the rotor to generate a signal responsive to the acceleration and revolutions per minute of the rotor. This signal may then be used in any of several methods, not important to this invention, to control an indicator or system which is responsive to accelerations and/or velocities. If the acceleration of the body ceases the voltage applied to the rotor also ceases. However, the rotor would continue to spin or coast down and the residual magnetism in the stator poles causes the spinning rotor to act as a generator. The flux field produced by the rotor will attempt to pull or rotate the stator in the same direction as the spinning rotor. This direction of movement is identical to the original mass displacement due to the acceleration. Again the pickup senses the movement and its output signal continues to drive the rotor. The back E.M.F. or generated voltage will always be proportional to the rotational velocity of the rotor. Hence the pulling effect of the stator will be proportional to the generated field. Therefore the rotational velocity of the rotor will be kept constant when the external acceleration is removed.

When a de-acceleration force is applied, the unbalanced mass attempts to travel further in the opposite direction from the original acceleration. This movement of the unbalanced mass in the opposite direction to the initial acceleration causes a reverse signal to be sensed by the pickup. This reversed signal will be amplified and applied to the rotor. The rotor field is reversed; therefore, the direction of torque between the rotor and stator is also reversed. This dynamic braking principle is utilized to position the unbalanced mass to the null position. The de-acceleration of the rotor will be proportional to the de-acceleration of the vehicle and the velocity of the revolutions per minute of the rotor will again be proportional to the velocity of the body. Since the revolutions per minute of the rotor is proportional to velocity, the number of turns the rotor makes is proportional to the distance traveled.

It is to be understood that the form of the invention that is herein shown and described is the preferred embodiment, and that various changes in the shape, size and arrangement of parts may be resorted to without departing from the spirit of the invention or the scope of the subjoined claims.

The following invention is claimed:

1. An air-bearing double integrating accelerometer comprising:
   (a) a cylindrical housing;
   (b) said housing having a segmental aperture therein normal to the longitudinal axis of the housing;
   (c) a plurality of fluid chambers disposed within said housing to uniformly distribute fluid within said housing;
   (d) means for supplying fluid to said chambers;
   (e) a cylindrical fluid supported sensing element disposed within said housing;
   (f) a lever arm having one end attached to said sensing element and a second end extending outwardly from said sensing element through said segmental aperture;
   (g) a plurality of permanent magnet stator poles disposed on the inner surface of said sensing element;
   (h) a D.C. motor rotor rotatably disposed within said housing;
   (i) pickup means carried on said housing for generating an electrical signal responsive to rotational movement of said lever arm and said sensing element;
   (j) means for energizing said rotor responsive to the signal produced by said pickup means; and
   (k) a torquer mounted on the outer periphery of said housing and disposed adjacent said lever arm for positioning the lever arm to a null position prior to movement of said housing.

2. The device as set forth in claim 1, wherein said means (j) for energizing said rotor comprises:
   (a) an amplifier connected to the output of said pickup means for amplifying the output signal from said pickup means;
   (b) a plurality of brushes disposed in said housing in electrical contact with said rotor; and
   (c) means for electrically connecting the output of said amplifier to said brushes.

3. The device as set forth in claim 2 wherein said pickup means comprises an inductive pickup device carried on said housing adjacent said lever arm and disposed for generating an electrical signal having a magnitude proportional to deviation of said lever arm and a polarity indicative of the direction said lever arm is displaced.

References Cited by the Examiner
UNITED STATES PATENTS

| | | | |
|---|---|---|---|
| 2,861,789 | 11/58 | Pope | 73—503 |
| 2,882,034 | 4/59 | Wuerth | 73—503 |
| 2,936,624 | 5/60 | Schalkowsky | 73—516 |
| 2,942,475 | 6/60 | Johnson | 73—516 |

RICHARD C. QUEISSER, Primary Examiner.

JAMES J. GILL, Examiner.